United States Patent [19]
Buerger

[11] 3,989,306
[45] Nov. 2, 1976

[54] WIRE WHEEL SIMULATING WHEEL COVER ASSEMBLY

[75] Inventor: Herbert Buerger, Walton, N.Y.

[73] Assignee: Del-Met Corporation, Walton, N.Y.

[22] Filed: July 7, 1975

[21] Appl. No.: 593,778

[52] U.S. Cl. .......................... 301/37 CM; 301/37 SS
[51] Int. Cl.² ............................................. B60B 7/04
[58] Field of Search .......... 301/37 SS, 37 CM, 37 L, 301/375 A; 29/159 A

[56] References Cited
UNITED STATES PATENTS

| | | | |
|---|---|---|---|
| 2,698,768 | 1/1955 | McLeod | 301/37 SS |
| 2,699,360 | 1/1955 | Jenkins, Jr. | 301/37 SS |
| 2,699,361 | 1/1955 | Jenkins, Jr. | 301/37 SS |
| 2,722,460 | 11/1955 | Dieterich | 301/37 SS |
| 2,767,027 | 10/1956 | Horn | 301/37 SS |
| 3,145,059 | 8/1964 | Hemstreet | 301/37 SS |
| 3,174,803 | 3/1965 | Mulhern et al. | 301/37 CM |
| 3,843,201 | 10/1974 | Buerger | 301/37 SS |

*Primary Examiner*—Robert B. Reeves
*Assistant Examiner*—Charles A. Marmor
*Attorney, Agent, or Firm*—J. B. Felshin

[57] ABSTRACT

This assembly comprises a metal wheel cover for an automobile wheel fixed at its outer rim to a full skirt lockring and having a central depressed wall onto which there is fitted a center cup having a bottom wall resting against the depressed wall. The cup is attached to said depressed wall and to a mounting plate overlying the front side of the bottom wall of the cup. A wire wheel basket overlies the front of the wheel cover and is held between an outer annular flange on the cover and the outer annular wall of the cup in assembled relation thereto. A decorative spinner simulating member fits into the center cup and is fixed to the mounting plate. The wire basket comprises an outer annular larger wire ring, disposed close to the outer flange of said wheel cover, and a pair of coaxial, axially spaced, similar smaller rings disposed axially outwardly of the larger ring, and sets of straight wire spokes welded at their outer ends to the larger ring and welded at their inner ends to one or the other of the smaller rings. Thus, the entire wheel cover assembly comprises the wheel cover with its lockring, the cup, the completely integrated wire basket, and central spinner simulating member, the mounting plate and the fasteners for attaching the cup and wheel cover to the mounting plate for attaching the central spinner simulating member to the mounting plate.

4 Claims, 3 Drawing Figures

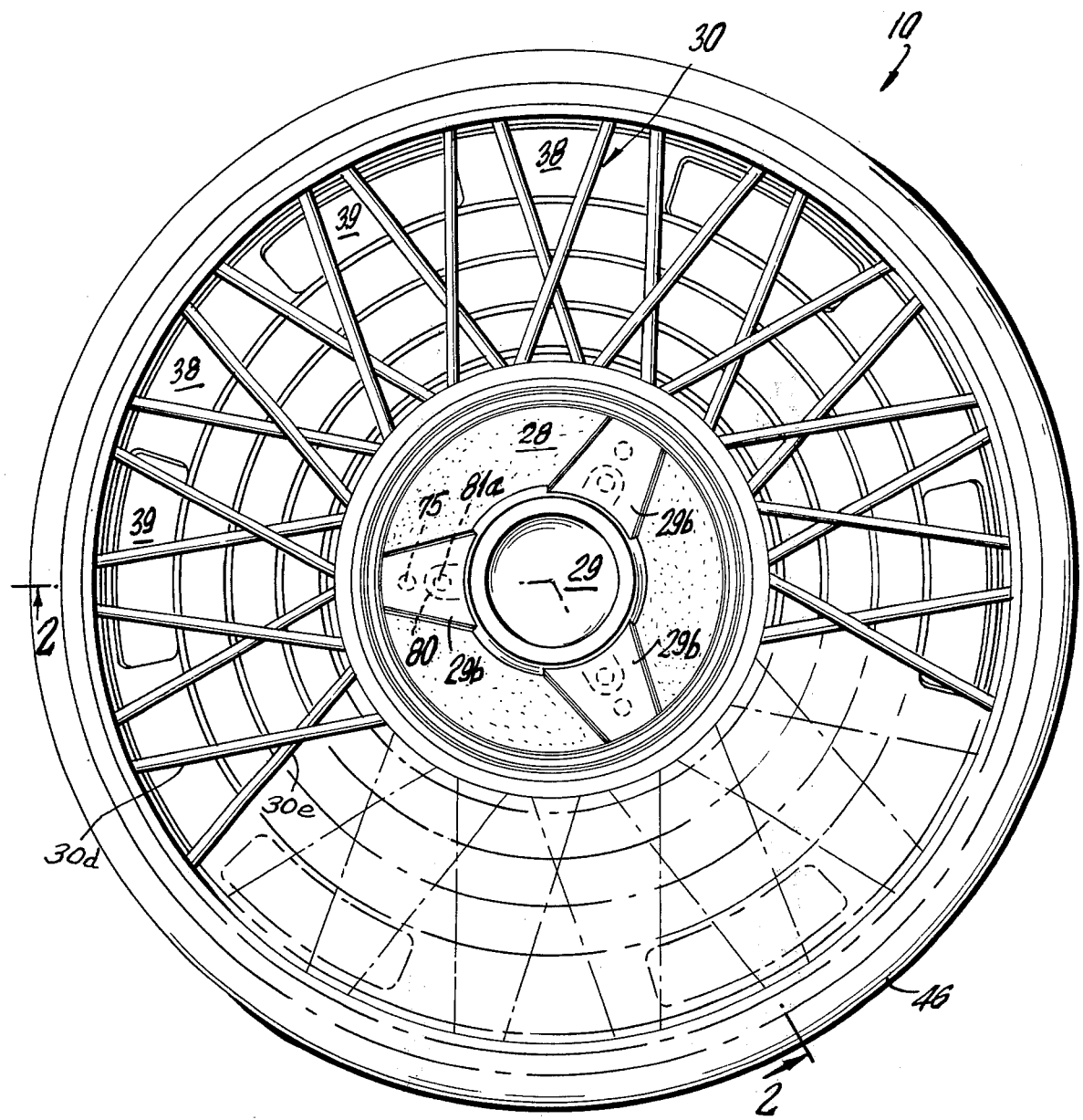
FIG. I

U.S. Patent   Nov. 2, 1976   Sheet 2 of 2   3,989,306
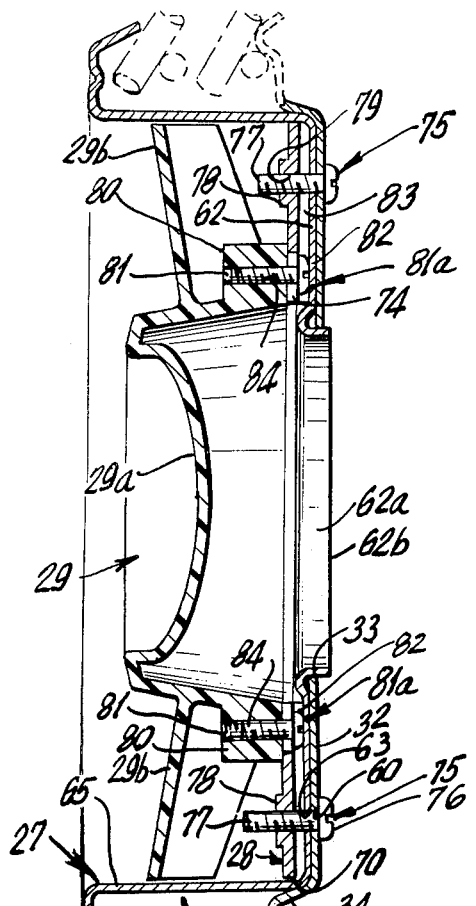
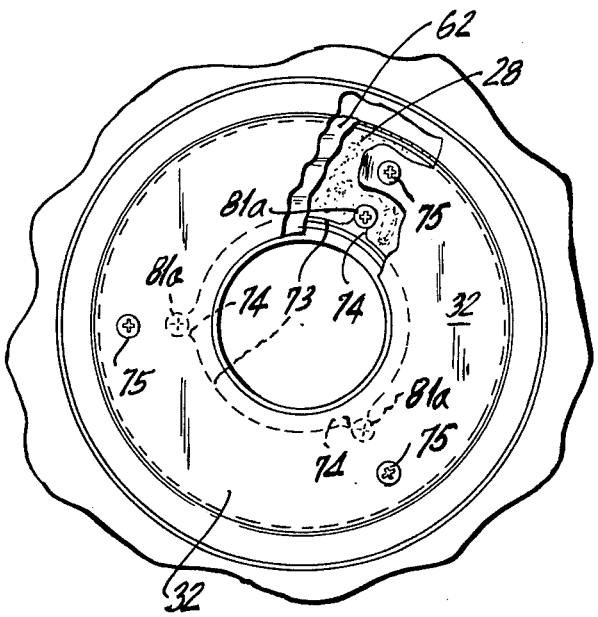
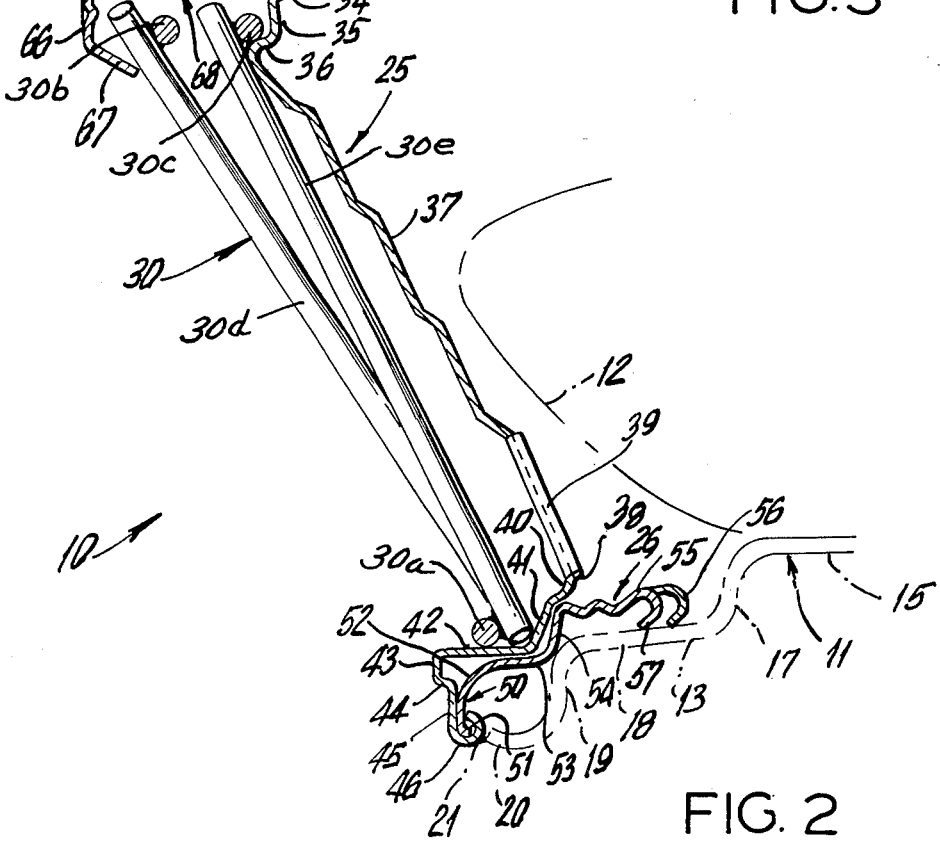
FIG. 3
FIG. 2

WIRE WHEEL SIMULATING WHEEL COVER ASSEMBLY

This invention relates to a wire wheel simulating wheel cover assembly.

One object of this invention is to provide a wheel cover assembly of the character described comprising a wheel cover and lockring, a center cup attached centrally to the wheel cover, and an integrated wire basket mounted on said wheel cover and held between an outer flange on the wheel cover and said cup.

A further object of this invention is to provide in a wheel cover assembly of the character described, a central spinner simulating member fitted into the cup and means to attach said spinner to said cup.

A still further object of this invention is to provide a wheel cover assembly of the character described in which the lockring is a full skirt lockring surrounding said wheel cover.

Yet another object of this invention is to provide a wheel cover assembly of the character described in which the wire basket comprises an outer wire ring, and a pair of axially spaced coaxial, smaller rings spaced axially outwardly of the larger ring and straight spokes welded at their outer ends to the larger ring and at their inner ends to one or the other of said smaller rings.

Still another object of this invention is to provide a cover wheel assembly of the character described in which the mounting plate is sandwiched in between the bottom wall of the cup and the inner side of the spinner simulating member.

Yet another object of this invention is to provide a strong, rugged and durable wheel cover assembly of the character described which shall be relatively inexpensive to manufacture, easy to assemble, attractive in appearance, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described and of which the scope of invention will be indicated in the following claims.

IN THE DRAWINGS

FIG. 1 is a front elevational view of a wire wheel simulating wheel cover assembly embodying the invention;

FIG. 2 is a cross-sectional view taken on line 2—2 of FIG. 1; and

FIG. 3 is a partial inside view of the assembly with parts broken away.

Referring now in detail to the drawing, 10 designates a wire wheel simulating wheel cover assembly embodying the invention. Said assembly is to be grippingly attached to an automobile wheel 11 of usual construction. Such wheel 11 comprises an annular hub 12 fixed to a tire carrying rim 13. Said tire rim 13 comprises an annular outwardly opening channel shaped portion 15 having a depressed annular web from which side flanges 17 (only one is shown) extend radially outwardly in the well known manner. Extending axially outwardly from the flange 17 shown in FIG. 2, is an annular wall 18. Extending radially outwardly from wall 18 is a wall 19 terminating in an axially outwardly extending lip or flange 20 of curved cross-section, and having an end edge 21. The tire rim described above is of usual well known construction.

The assembly 10 comprises generally of a wheel cover 25, a lockring 26 attached thereto in the manner hereinafter appearing, a center cup 27, a mounting plate 28, a spinner simulating member 29 and a wire basket 30.

The wheel cover 25 may be made of die pressed sheet metal and comprises a central flat depressed wall 32 formed with a central hole 33. Extending axially and radially outwardly from said depressed wall 32 is an annular wall 34 from which there extends a substantially flat annular shoulder 35. Extending axially outwardly from said shoulder 35 is an annular wall 36. Extending radially outwardly and axially inwardly from wall 36 is a substantially frusto-conical stepped wall 37. Extending from wall 37 is an inclined wall 38 which is inclined similarly to wall 37 and is formed with a plurality of equiangularly spaced slots 39. Extending from wall 38 is shoulder 40 which is of curved radial cross-section and projects radially and axially outwardly. Extending from wall 40 in a radially and axially outwardly direction is an outwardly tapering wall 41. Extending from the outer end of wall 41 is a cylindrical axially outwardly projecting wall 42. Extending from wall 42 is a flat radially outwardly extending wall 43. Extending axially inwardly from said wall 43 is a wall 44. Extending axially outwardly from wall 44 is a flat wall 45 terminating in an inwardly rolled bead 46 for attaching the wheel cover to the lockring 26, as will appear hereinafter.

As shown in FIG. 2 of the drawing, when the assembly is mounted on the wheel 11, in the manner to be explained hereinafter, bead 46 is close to the edge 21; wall 42 is of a radius substantially like that of wall 18 and the junction of walls 41, 42 is close to the junction of walls 18 and 19 of the tire rim. Thus the radially outer portion of the wheel cover hides the inner surfaces of walls 20, 19, 18 and 17 from view from the outside.

The lockring 26 is made of metal and comprises a radially outwardly extending wall 50 contacting the inner surface of wall 45, and projecting into the bead 46. At the radially outer end of wall 50 is an axially inwardly extending annular lip 51 disposed within said bead 46. Extending radially and axially inwardly from wall 50, is a wall 52 which is of curved radial cross-section. Extending from wall 52 is an axially inwardly extending wall 53 somewhat spaced from wall 42 of the wheel cover. Extending from wall 53 in a radially and axially inwardly inclined direction, is a wall 54. The inner end of wall 54 is somewhat spaced from wall 40 of the wheel cover. Extending from wall 54 is a corrugated annular wall 55 extending generally in an axially inward direction. Extending from wall 55 are alternating long and short fingers 56, 57 having bent back lips scrapingly or grippingly and resiliently engaging the inner surface of wall 18 of the tire rim in the manner shown in my copending application Ser. No. 280,827 filed Aug. 15, 1972, now U.S. Pat. No. 3,843,201.

The depressed wall 32 of the wheel cover 25 has three equiangularly spaced holes 60 for the purpose hereinafter appearing. The cup 27 may be made of sheet metal and comprises a flat annular wall 62 contacting the axially outer surface of wall 32 and has holes 63 registering with holes 60 for the purpose which will be explained later. Said wall 62 has a central hole 62a formed by an axially inwardly extending annular flange 62b projecting through hole 33 and substantially contacting the inner edge of said hole.

At the radially outer end of wall 62 there extends axially outwardly a cylindrical wall 65 contacting the inner surface of wall 34 at its junction with wall 32. Wall 65 projects well beyond wall 36, as shown in FIG. 2 of the drawing. Extending radially outwardly from the axially outer end of wall 65 is a wall 66 from which there extends radially outwardly but axially inwardly an inclined flange 67 well spaced from walls 35, 36 of the wheel cover 25 and overlapping said walls to produce a radially outwardly opening annular channel 68 surrounding wall 65.

Disposed within the cup 27 and spaced from the wall 62 of said cup, is said mounting plate 28. Said mounting plate 28 is flat and is parallel to wall 62. The outer rim edge 70 of said mounting plate 28 is close to but spaced from the inner surface of wall 65. Said mounting plate is formed with a central hole having an inner edge 73. At the inner edge 73 are three equiangularly spaced radial slots 74 radially aligned with registering holes 60, 63.

The cup 27 is attached to the wheel cover 25 and to the mounting plate 28 by three screws 75. Each screw 75 has a head 76 and a screw shank 77. Mounting plate 28 is formed with three equiangularly spaced bosses 78 each formed with internally screw threaded hole 79 registering with a pair of registering holes 60, 63. The beads 76 of screws 75 contact the axially inner surface of wall 32. The shanks 77 pass through registering holes 60, 63 and are screwed through holes 79.

The spinner simulating member 29 is disposed within the cup 27 and may be of any ornamental shape to simulate a spinner. It may be molded of hard plastic material. It rests on the mounting plate 28. It has at its axially inner end, three equiangularly spaced bosses 80 formed with internally threaded through openings 81 registering with radial slots 74.

The spinner simulating member 29 is fixed to the mounting plate by screws 81a. Each screw 81a has a head 82 contacting the axially inner surface of the mounting plate and disposed in the space 83 between the mounting plate and the wall 62 of the cup 27. The screws 81a further comprise screw shanks 84 which pass through the slots 74 and are screwed into threaded holes 81.

The spinner simulating member 29 may comprise a central hub portion 29a, radial ribs 29b as shown in the drawing.

Said wire basket 30 overlies the radially outwardly extending portion 37. Said basket has a radially inner end projecting into the channel formed by portions 65, 66, 67 of member 27 and portions 35, 36 of member 25. Said basket 30 has radially outer end abutting said axially outwardly extending walls 41, 42 whereby said basket is retained on the wheel cover.

Said wire basket 30 comprises an outer ring 30a, and inner rings 30b, 30c coaxial with respect to said outer ring 30a. The inner rings 30b, 30c are axially spaced from each other and spaced axially outwardly of said outer ring. Rings 30b, 30c are of same diameter. Ring 30b is spaced axially outwardly of ring 30c.

Said basket further comprises a plurality of straight spokes 30d, 30e. All said spokes are spaced from one another and inclined radially inwardly and axially outwardly. The outer ends of all said spokes are fixed to the axially inner side of the outer ring. The inner ends of spokes 30d are fixed to the radially outer side of inner ring 30b. The inner ends of spokes 30e are fixed to the axially outer side of inner ring 30c. Spokes 30d alternate with spokes 30e. Each spoke 30d crosses a spoke 30e.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative.

I claim:

1. A wire wheel simulating wheel cover assembly comprising a wheel cover having a central portion, and a portion extending radially outwardly of said central portion, an integrated annular wire basket overlying said radially outwardly extending portion, means forming an outwardly opening annular channel between the central portion and said radially outwardly extending portion of said wheel cover, means to attach said first mentioned means to said central portion of said wheel cover, said basket having a radially inner end projecting into said channel, an axially outwardly extending means at the outer end of said radially outwardly extending portion of said wheel cover, said basket having a radially outer end abutting said axially outwardly extending means, whereby said basket is retained on said wheel cover, said wire basket comprising an outer ring, a pair of inner rings coaxial with respect to said outer ring and axially spaced from each other, and spaced axially outwardly of said outer ring, and a plurality of straight spokes all spaced from one another and inclined radially inwardly and axially outwardly, the outer ends of all said spokes being fixed to said outer ring, the inner ends of alternate spokes being fixed to alternate inner rings, said means forming an outwardly opening channel comprising a cup, said central portion comprising a depression and said cup fitting into said depression, said cup having a bottom wall contacting said central portion, and an axially outwardly extending cylindrical portion extending from said bottom wall, and a radially outwardly extending flange at the axially outer end of said axially outwardly extending portion of said cup, said means to attach said channel forming means to said central portion of said wheel cover comprising a plate within said cup and screw threaded fasteners passing through registering holes in said central portion and in said bottom wall and being screwed into threaded holes in said plate.

2. The combination of claim 1, a spinner simulating member housed in said cup, and means to attach said spinner simulating member to said plate.

3. The combination of claim 1, the outer ends of said spokes being located at the axially inner side of said outer ring, the inner ends of said spokes being located at axially outer sides of the inner rings to which they are fixed.

4. The combination of claim 1, said inner rings being of similar diameter.

* * * * *